(12) United States Patent
Matza

(10) Patent No.: US 10,583,392 B2
(45) Date of Patent: Mar. 10, 2020

(54) DECONTAMINATION OF SULFUR CONTAMINANTS FROM A VESSEL

(71) Applicant: United Laboratories International, LLC, Houston, TX (US)

(72) Inventor: Stephen D. Matza, Sugar Land, TX (US)

(73) Assignee: United Laboratories International, LLC, Houston, TX (US)

( * ) Notice: Subject to any disclaimer, the term of this patent is extended or adjusted under 35 U.S.C. 154(b) by 0 days.

(21) Appl. No.: 16/107,535

(22) Filed: Aug. 21, 2018

(65) Prior Publication Data

US 2018/0353900 A1 Dec. 13, 2018

Related U.S. Application Data

(63) Continuation of application No. 14/859,472, filed on Sep. 21, 2015, now Pat. No. 10,052,583.

(51) Int. Cl.
| | |
|---|---|
| *B01D 53/52* | (2006.01) |
| *B01D 53/76* | (2006.01) |
| *B01D 53/77* | (2006.01) |
| *B01D 53/78* | (2006.01) |
| *C02F 1/72* | (2006.01) |
| *C02F 101/10* | (2006.01) |
| *C02F 103/36* | (2006.01) |

(52) U.S. Cl.
CPC .............. *B01D 53/52* (2013.01); *C02F 1/72* (2013.01); *B01D 2251/10* (2013.01); *B01D 2252/20436* (2013.01); *B01D 2255/20738* (2013.01); *C02F 1/725* (2013.01); *C02F 2101/101* (2013.01); *C02F 2103/365* (2013.01); *C02F 2209/02* (2013.01); *C02F 2301/046* (2013.01); *C02F 2303/02* (2013.01); *C02F 2305/02* (2013.01)

(58) Field of Classification Search
None
See application file for complete search history.

(56) References Cited

U.S. PATENT DOCUMENTS

| | | | |
|---|---|---|---|
| 8,993,488 B2 | 3/2015 | Frost et al. | |
| 9,512,019 B2 | 12/2016 | Matza et al. | |
| 9,815,720 B2 | 11/2017 | Matza et al. | |
| 9,920,236 B2 * | 3/2018 | Matza | C09K 8/52 |
| 10,052,583 B2 * | 8/2018 | Matza | B01D 53/52 |
| 2010/0137170 A1 | 6/2010 | Wolf et al. | |
| 2012/0220500 A1 | 8/2012 | Matza et al. | |

(Continued)

OTHER PUBLICATIONS

International Search Report and Written Opinion for International Application No. PCT/US2016/052672 dated Dec. 8, 2016.

(Continued)

*Primary Examiner* — Daniel Berns
(74) *Attorney, Agent, or Firm* — Tumey L.L.P.

(57) ABSTRACT

A method for treating sulfur contaminants is provided. The method comprises introducing a methylmorpholine-N-oxide solution to a vessel, wherein the vessel comprises a water layer and a gas layer, wherein the water layer and the gas layer comprise the hydrogen sulfide; introducing methylmorpholine-N-oxide into the water layer; and treating the water layer by allowing the methylmorpholine-N-oxide to react with the hydrogen sulfide.

4 Claims, 2 Drawing Sheets

(56) References Cited

U.S. PATENT DOCUMENTS

2013/0126444 A1   5/2013   Matza et al.
2015/0027961 A1   1/2015   Matza et al.
2015/0166877 A1   6/2015   Matza et al.

OTHER PUBLICATIONS

Non-Final Office Action for U.S. Appl. No. 14/859,472 dated Mar. 22, 2017.
Fiinal Office Action for U.S. Appl. No. 14/859,472 dated Dec. 18, 2017.
Notice of Allowance for U.S. Appl. No. 14/859,472 dated Apr. 26, 2018.
USPTO Issue Notification for U.S. Appl. No. 14/859,472 dated Aug. 1, 2018.

* cited by examiner

DECONTAMINATION OF SULFUR CONTAMINANTS FROM A VESSEL

CROSS-REFERENCE TO RELATED APPLICATIONS

This is a continuation application of U.S. patent application Ser. No. 14/859,472 filed on Sep. 21, 2015, titled "Decontamination of Sulfur Contaminants from a Vessel," the entire disclosure of which is herein incorporated by reference.

BACKGROUND OF THE INVENTION

Field of the Invention

Methods and systems for the decontamination of sulfur contaminates from vessels containing sulfur contaminants are provided. Specifically, methods and systems of using methylmorpholine-N-oxide to remove sulfur contaminants from vessels comprising water and/or gas contaminated with sulfur contaminants are provided.

Background of the Invention

Refineries and petrochemical plants are commonly contaminated with sulfur contaminants such as $H_2S$. These sulfur contaminants may typically be mitigated or removed as part of decontamination procedures, for instance, prior to vessel (e.g., large storage tanks) entry by individuals. A conventional approach to decontamination is to use hydrogen sulfide scavengers (e.g., liquid scavengers) such as triazine, acrolein, or formaldehyde. Such scavengers may rely on non-oxidative complexation and may be an economical approach for $H_2S$ decontamination. Liquid scavengers may tie up $H_2S$ as water-soluble compounds that may be discharged to wastewater treatment facilities. However, such scavengers have drawbacks. For instance, some of the reaction products may not be water-soluble, and some of the treatment chemicals may have associated toxicity or environmental restrictions in certain locations. In addition, some sulfur contaminants may only be removed by specific scavengers, for example, typically only acrolein may neutralize pyrophoric iron sulfides. Additionally, triazine treatments may raise the pH of effluent streams and as a result, may promote the formation of scales on metal surfaces. Formaldehyde reactions with $H_2S$ typically produce water insoluble products. Further, acrolein benefits may be tempered by its toxicity.

Other methods have been developed and demonstrated to be effective at oxidizing and eliminating sulfur contaminants. Such methods include using permanganate (e.g., potassium peiinanganate), persulfate, sodium nitrite, ozone, hypochlorite, adducts of peroxide such as perborates and percarbonates, and long-chain amine oxides. The oxidizing chemicals may irreversibly convert sulfur contaminants (e.g., $H_2S$) to harmless water soluble forms of sulfur, which may be compatible with effluent discharge. Each of these oxidizing compounds (i.e., oxidizing chemicals) have certain drawbacks. Hypochlorite may form dangerous chlorine compounds. Ozone and permanganate may involve field mixing. Permanganate decontaminations may be further complicated by large amounts of reaction solids that are typically processed at additional cost. Percarbonates, as with permanganate, may also be exothermic in their reaction, which may be particularly dangerous if hydrocarbon vapors are present. Further, treatments using strong oxidizers (i.e., permanganate, percarbonate, persulfate) are typically accomplished in small sequential batches outside the storage vessel in order to control the associated exotherm. As a result, these treatments may involve considerable time and therefore cost. The strong oxidizers may also be corrosive. Moreover, these compounds may also react violently with hydrocarbon components that may be present in sour sludge. For example, the strong oxidizers may be non-selective in their reaction and may react with many of the hydrocarbon components that may exist in sludge which may be contained in storage vessels. As a result, these treatments may be preformed in small sequential batches outside the vessel, which may increase operation time and expenditures.

Mild oxidizers such as amine oxides and nitrites may be effective at oxidizing sulfur contaminants to harmless forms of sulfur while having limited or having no effect on hydrocarbons, unlike strong oxidizers. Additionally, mild oxidizers may be added directly to a vessel as their associated reactions may be non-exothetinic. However, mild oxidizers also have drawbacks. For instance, typical long-chain amine oxides may pose foaming issues due to their surfactant nature. These amine oxides may also have limited efficiency for large amounts of $H_2S$, since they are typically diluted in water to prevent gel formation. Nitrites may also have drawbacks, as their reaction with hydrogen sulfide produces ammonia. As a result, the nitrite oxidation reaction may be accompanied by a rise in pH, which at some point may cease the oxidation before it is complete.

Consequently, there is a need for improved methods and systems for decontaminating vessels contaminated with sulfur contaminants.

BRIEF SUMMARY OF SOME OF THE PREFERRED EMBODIMENTS

These and other needs in the art are addressed in one embodiment by a method for removing hydrogen sulfide. The method may comprise introducing a methylmorpholine-N-oxide solution to a vessel, wherein the vessel comprises a water layer and a gas layer, wherein the water layer and the gas layer comprise the hydrogen sulfide; introducing methylmorpholine-N-oxide into the water layer; and treating the water layer by allowing the methylmorpholine-N-oxide to react with the hydrogen sulfide.

These and other needs in the art are addressed in another embodiment by a method for removing hydrogen sulfide. The method may comprise introducing a methylmorpholine-N-oxide solution to a vessel, wherein the vessel comprises a water layer and a gas layer, wherein the water layer and the gas layer comprise the hydrogen sulfide; introducing methylmorpholine-N-oxide into the gas layer; and treating the gas layer by allowing the methylmorpholine-N-oxide to react with the hydrogen sulfide.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments, reference will now be made to the accompanying drawings in which.

DETAILED DESCRIPTION OF THE PREFERRED EMBODIMENTS

Figure 1:
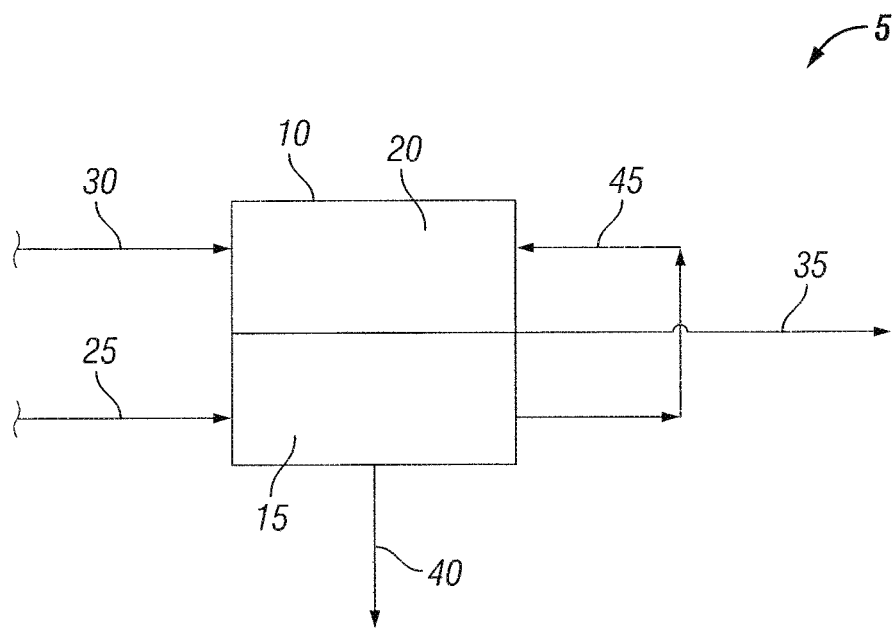
FIG. 1 illustrates an embodiment of a methylmorpholine-N-oxide water treatment method.

FIG. 1 illustrates an embodiment of methylmorpholine-N-oxide water treatment method 5. In an embodiment, methylmorpholine-N-oxide water treatment method 5 treats a vessel comprising water and gas contaminated with sulfur contaminants by decontaminating the water and gas by removing a portion or all of the sulfur contaminants from the water and the gas.

In embodiments as shown in FIG. 1, contaminated water (e.g., sour water) and/or contaminated gas (e.g., sour gas) may be disposed within vessel 10. As used herein, "contaminated" refers to water and/or gas contaminated with sulfur contaminants. It is to be understood that "contaminated" does not exclude water and gas contaminated with other types of contaminants in addition to or other than the sulfur contaminants Vessel 10 may include any type of vessel that may contain water and gas. In an embodiment, vessel 10 is a tank. In some embodiments, vessel 10 comprises a water layer 15 and a gas layer 20. In embodiments, one or both of the water layer 15 and the gas layer 20 are contaminated with sulfur contaminants. Without limitation, examples of sulfur contaminants include hydrogen sulfide, iron sulfides, or any combinations thereof. In an embodiment, the sulfur contaminant comprises hydrogen sulfide. In some embodiments, the iron sulfides comprises pyrophoric iron sulfides. The pyrophoric iron sulfides may include any pyrophoric iron sulfides. In embodiments, the pyrophoric iron sulfides comprise pyrite, troilite, marcasite, pyrrhotite, or any combination thereof.

The water layer 15 and the gas layer 20 may be contaminated with the sulfur contaminants by any method of contamination. The sulfur contaminants may be provided to the water layer 15 and the gas layer 20 from any source. The sulfur contaminants may be present in the water layer 15 and the gas layer 20 at any concentration. Without limitation, the sulfur contaminants may be present in the water layer 15 and/or the gas layer 20 in an amount in a range including any of and between any of about 100 ppm to about 180,000 ppm. For example, the sulfur contaminants may be present in the water layer 15 and the gas layer 20 in an amount of about 100 ppm, about 500 ppm, about 1000 ppm, about 5000 ppm, about 10,000 ppm, about 15,000 ppm, about 50,000 ppm, about 100,000 ppm, about 150,000 ppm, about 180,000 ppm, or any ranges therebetween.

FIG. 1 shows an embodiment of a methylmorpholine-N-oxide water treatment method 5 in which methylmorpholine-N-oxide 25 is introduced to vessel 10. In the embodiment illustrated by FIG. 1, methylmorpholine-N-oxide 25 is introduced to the water layer 15 disposed within vessel 10. Methylmorpholine-N-oxide 25 may be introduced to vessel 10 by any suitable means. Without limitation, examples of such suitable means include a drum pump, tank truck, and the like. Methylmorpholine-N-oxide 25 may be introduced in any suitable form for removing the contaminants from the contaminated water. In some embodiments, methylmorpholine-N-oxide 25 is in a methylmorpholine-N-oxide solution comprising the methylmorpholine-N-oxide 25 and water. The methylmorpholine-N-oxide solution may have the methylmorpholine-N-oxide 25 in any desired amount. In some embodiments, the methylmorpholine-N-oxide 25 may be in a very concentrated form in the methylmorpholine-N-oxide solution. Without being limited by theory, such very concentrated form may allow the methylmorpholine-N-oxide 25 to be applied in small, efficient amounts. The concentrated form may include any desirable concentration. In an embodiment, the concentration of methylmorpholine-N-oxide 25 in the water layer 15 is between about 0.01 weight volume % and about 60 weight volume %, alternatively between about 10 weight volume % and about 20 weight volume %, further alternatively between about 5 weight volume % and about 60 weight volume %, and alternatively between about 50 weight volume % and about 60 weight volume %. In embodiments, the concentration of methylmorpholine-N-oxide 25 in the water layer 15 may be any individual weight volume % in the above ranges or any smaller range of weight volume % that is included in the above ranges. In an embodiment, the concentration of methylmorpholine-N-oxide 25 in the water layer 15 is between about 0.01 weight volume % and about 10 weight volume %. In an embodiment, the methylmorpholine-N-oxide 25 is a short-chain amine oxide. In embodiments, the methylmorpholine-N-oxide 25 has the molecular formula $C_5H_{11}NO_2$. In vessel 10, methylmorpholine-N-oxide 25 contacts the water layer 15 comprising the sulfur contaminants. In some embodiments, methylmorpholine-N-oxide 25 is not heated before introduction to vessel 10. In embodiments, the amount of methylmorpholine-N-oxide 25 added to vessel 10 provides a mole ratio of methylmorpholine-N-oxide:a sulfur contaminant in the water layer 15 disposed within vessel 10 from about 1.0 mole methylmorpholine-N-oxide:1.0 mole of a sulfur contaminant to about 3.0 mole methylmorpholine-N-oxide:1.0 mole of a sulfur contaminant, or any range or mole ratio therebetween.

In the embodiments shown in FIG. 1, steam 30 may also be added to vessel 10. Steam 30 may be added to increase the temperature of the water layer 15 and/or the gas layer 20 disposed within vessel 10. In some embodiments, steam 30 may be added to vessel 10 in amounts as desired. In some embodiments, steam 30 may be added in a continuous manner. Without limitation, steam 30 may be added to increase the temperature of the water layer 15 and/or the gas layer 20 to a temperature from about 70° F. to about 250° F., alternatively, from about 75° F. to about 125° F., from about 120° F. to about 250° F., from about 150° F. to about 235° F., or further alternatively, from about 200° F. to about 250° F. In embodiments, the temperature may be any individual temperature in the above ranges or any smaller range of temperatures that is included in the above ranges. Any suitable psig steam 30 may be used. In embodiments, the steam 30 is 150 psig or less. In an embodiment, the steam 30 is 50 psig. In an embodiment, the steam 30 is 150 psig.

With continued reference to FIG. 1, as the methylmorpholine-N-oxide 25 reacts with and removes the sulfur contaminants in the water layer 15, the concentration gradient of the sulfur contaminants in the water layer 15 may decrease, and the capacity of the water layer 15 to dissolve more of the sulfur contaminants may be increased. Any sulfur contaminants that may have been present in the gas layer 20 or any sulfur contaminants that may have evaporated into the gas layer 20 after a heat transfer initiated by the application of the steam 30 may contact the interface between the water layer 15 and the gas layer 20 and may condense into the water layer 15. The rate at which the sulfur contaminants condense into the water layer 15 may be determined by the temperature, pressure, and the concentration gradient of the sulfur contaminants in the water layer 15. The methylmorpholine-N-oxide 25 may then act to remove the sulfur contaminants that have condensed into the water layer 15 from the gas layer 20, thus decontaminating both the water layer 15 and the gas layer 20. The rate of condensation may be adjusted by reducing the temperature of the system, increasing the pressure of the system, increasing the surface area of the interface between the water layer 15 and the gas layer 20, or any other suitable means for condensing the sulfur contaminants into the water layer 15.

Figure 2:
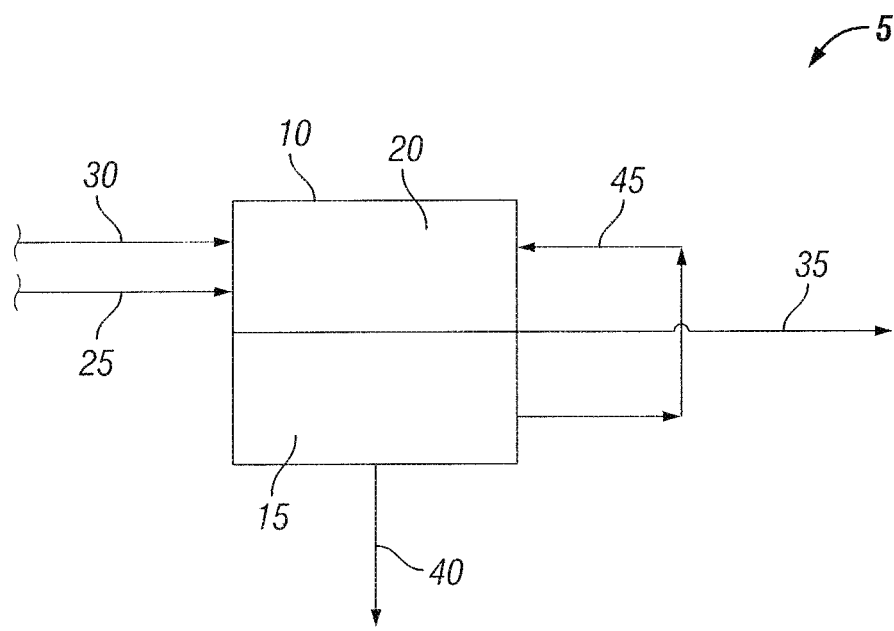
FIG. 2 illustrates another embodiment of a methylmorpholine-N-oxide water treatment method.

FIG. 2 illustrates another embodiment of methylmorpholine-N-oxide water treatment method 5. As with FIG. 1, methylmorpholine-N-oxide water treatment method 5 treats a vessel 10 comprising a water layer 15 and a gas layer 20 contaminated with sulfur contaminants by decontaminating the water layer 15 and the gas layer 20 by removing a portion or all of the sulfur contaminants from the water layer 15 and the gas layer 20. However, FIG. 2 shows an embodiment of methylmorpholine-N-oxide water treatment system 5 in which methylmorpholine-N-oxide 25 is introduced to vessel 10 in the gas layer 20. In the embodiment illustrated by FIG. 2, methylmorpholine-N-oxide 25 may be introduced to the gas layer 20 disposed within vessel 10 by any suitable means. Without limitation, examples of such suitable means include a drum pump, tank truck, and the like. As in FIG. 1, steam 30 may be added to vessel 10 to increase the temperature of the gas layer 20. For the embodiment described by FIG. 2, the temperature of the gas layer 20 may be higher than the boiling point of the methylmorpholine-N-oxide 25 so as to maintain the methylmorpholine-N-oxide in the gas phase. Specifically, the temperature of the gas layer 20 may be above 234° F. In alternative embodiments, methylmorpholine-N-oxide 25 may be added with steam 30. Further, alternatively, if desired, the temperature of the gas layer 20 may be reduced to below the boiling point of the methylmorpholine-N-oxide 25, and the methylmorpholine-N-oxide 25 may condense into the water layer 15. The methylmorpholine-N-oxide 25 may be introduced into the gas layer 20 in any desired amount. In some embodiments, the methylmorpholine-N-oxide 25 may be in a very concentrated form in the gas layer 20. In an embodiment, the concentration of methylmorpholine-N-oxide 25 in the gas layer 20 is between about 0.01 weight volume % and about 60 weight volume %, alternatively between about 10 weight volume % and about 20 weight volume %, further alternatively between about 5 weight volume % and about 60 weight volume %, and alternatively between about 50 weight volume % and about 60 weight volume %. In embodiments, the concentration of methylmorpholine-N-oxide 25 in the gas layer 20 may be any individual weight volume % in the above ranges or any smaller range of weight volume % that is included in the above ranges. In an embodiment, the concentration of methylmorpholine-N-oxide 25 in the gas layer 20 is between about 0.01 weight volume % and about 10 weight volume %. In embodiments, the amount of methylmorpholine-N-oxide 25 added to vessel 10 provides a mole ratio of methylmorpholine-N-oxide:a sulfur contaminant in the gas layer 20 disposed within vessel 10 from about 1.0 mole methylmorpholine-N-oxide:1.0 mole of a sulfur contaminant to about 3.0 mole methylmorpholine-N-oxide:1.0 mole of a sulfur contaminant, or any range or mole ratio therebetween.

As with FIG. 1, steam 30 may also be added to vessel 10 in the embodiment illustrated by FIG. 2. Without limitation, steam 15 may be added to increase the temperature of the water layer 15 and/or the gas layer 20 to a temperature from about 70° F. to about 250° F., alternatively, from about 75° F. to about 125° F., from about 120° F. to about 250° F., from about 150° F. to about 235° F., or further alternatively, from about 200° F. to about 250° F. In embodiments, the temperature may be any individual temperature in the above ranges or any smaller range of temperatures that is included in the above ranges. Any suitable psig steam 30 may be used. In embodiments, the steam 30 is 150 psig or less. In an embodiment, the steam 30 is 50 psig. In an embodiment, the steam 30 is 150 psig.

With continued reference to FIG. 2, as the methylmorpholine-N-oxide 25 reacts with and removes the sulfur contaminants in the gas layer 20, the concentration gradient of the sulfur contaminants in the gas layer 20 may decrease. Any sulfur contaminants that may have been present in the water layer 15 may evaporate into the gas layer 20 after a heat transfer initiated by the application of the steam 30. The rate at which the sulfur contaminants evaporate into the gas layer 20 may be determined by the temperature, pressure, and the concentration gradient of the sulfur contaminants in the gas layer 20. The methylmorpholine-N-oxide 25 may then act to remove the sulfur contaminants that have evaporated into the gas layer 20 from the water layer 15, thus decontaminating both the gas layer 20 and the water layer 15. The rate of evaporation may be adjusted by increasing the temperature of the system, reducing the pressure of the system, increasing the surface area of the interface between the water layer 15 and the gas layer 20, or any other suitable means for evaporating the sulfur contaminants into the water layer 15.

Figure 3:
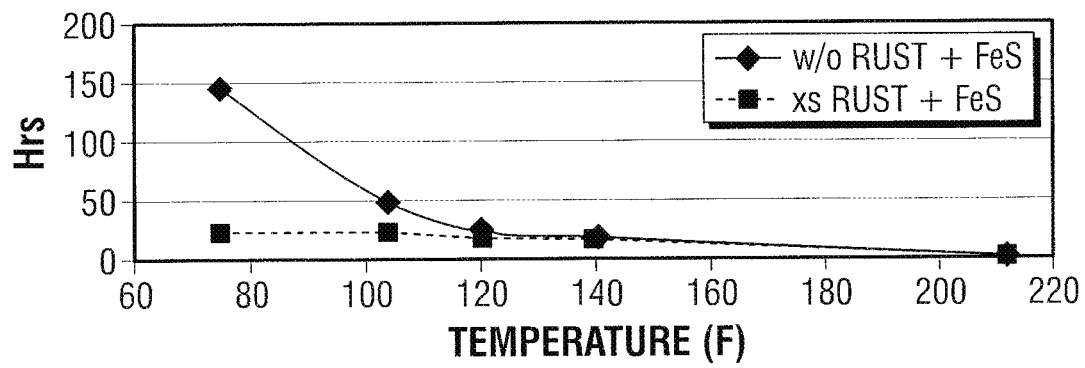
FIG. 3 illustrates reaction time versus temperature of a reaction methylmorpholine-N-oxide and $H_2S$.

With reference to FIGS. 1 and 2, in optional embodiments, the methylmorpholine-N-oxide 25 may react with the sulfur contaminants in the presence of iron oxide (e.g., rust). Without being limited by theory, the presence of iron oxide catalyzes the methylmorpholine-N-oxide 25 to convert the sulfur contaminants to elemental sulfur and thiosulfate reaction products irreversibly. Any suitable iron oxide may be used. In embodiments, the iron oxide includes hydrated iron oxide, anhydrous iron oxide, or any combinations thereof. In an embodiment, the iron oxide is hydrous iron oxide. In embodiments, the iron oxide includes ferrous or ferric oxides that are hydrated. In an embodiment, the iron oxide is $Fe_2O_3.7H_2O$, $Fe_2O_3.10H_2O$, or any combinations thereof. The iron oxide may be present in vessel 10 in any amount suitable to catalyze the reaction between the amine oxide and the contaminants. In an embodiment, vessel 10 has iron oxide in the water layer 15 in an amount from about 100 ppm iron oxide to about 1,000 ppm iron oxide. In embodiments, the iron oxide may be present in any individual amount in the above range or any smaller range of amounts that is included in the above range. In embodiments, no iron oxide is added to vessel 10 as methylmorpholine-N-oxide water treatment method 5 uses the iron oxide already present in vessel 10. In other embodiments, iron oxide is added to vessel 10. Without limitation by theory, the reaction to remove the sulfur contaminants from the water layer 15 and the gas layer 20 comprises methylmorpholine-N-oxide, steam, and iron oxide. The reaction may be allowed to occur for a sufficient time to allow the sulfur contaminants to be removed (i.e., converted) from the water layer 15 and/or the gas layer 20. In embodiments, the reaction is allowed to occur from about one hour to about fifty hours, alternatively from about one hour to about twenty-five hours. In embodiments, the reaction time may be any individual time in the above times or any smaller time ranges that are included in the above ranges. FIG. 3 illustrates examples of reaction time versus temperature. Without limitation by theory, it is to be understood that the higher the temperature, the less reaction time may be used. In embodiments, the reaction is allowed to occur for a sufficient time to substantially remove all of the sulfur contaminants (i.e., convert substantially all of the reactive sulfide to elemental sulfur). In some embodiments, the reaction produces substantially no foaming. And, in some embodiments, the reaction also may not generate ammonia. In an embodiment, the reaction is non-exothermic. In other embodiments, surfactants are not added to the contaminated water or methylmorpholine-N-oxide 25. In some embodiments (e.g., the embodiment described by FIG. 1), if sufficient iron oxide is present, a suitable reaction time for an application may be obtained without the use of steam 30. Thus, for some embodiments (not illustrated), steam is not added to vessel 10.

After the desired reaction time occurs (i.e., sulfide conversion is about complete), the treated water 35 (i.e., treated water) may be drawn off from vessel 10 and nonhazardous products 40 may also be removed from vessel 10. Treated water 35 may be sent to any desired location such as a water treatment plant. In embodiments, treated water 35 has no sulfur contaminants. Nonhazardous products 40 include nonhazardous sulfur reaction products along with other native solids in vessel 10 (i.e., sludge). Nonhazardous products 40 may be removed from vessel 10 by any suitable means. In an embodiment, the means include a centrifuge. In embodiments, the liquid portion of the effluent passing from the centrifuge may then be routed to a treatment facility or any other desirable location.

In the embodiments shown in FIGS. 1 and 2, methylmorpholine-N-oxide water treatment method 5 may also include re-circulation 45. Re-circulation 45 is the re-circulation of the water layer 15. In some embodiments, water layer 15 containing methylmorpholine-N-oxide 25 is re-circulated. Without limitation, re-circulation 45 facilitates distribution of methylmorpholine-N-oxide 25 in the water layer 15. In an embodiment, from about one volume of the total amount of water layer 15 in vessel 10 to about two volumes of the total amount of water layer 15 in vessel 10 may be re-circulated. In embodiments, re-circulation 45 may include re-circulation of any volume of water layer 15 or range of volumes less than two.

Figure 4:
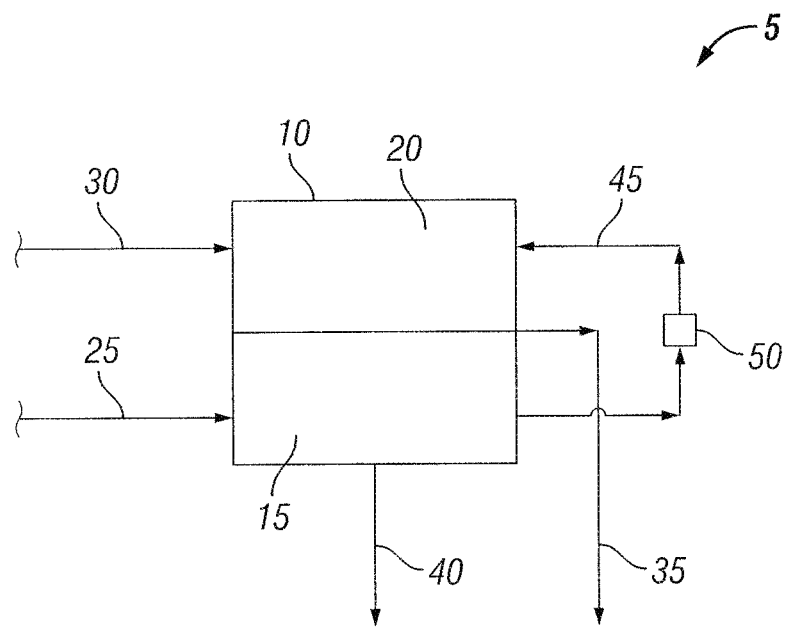
FIG. 4 illustrates an embodiment of a methylmorpholine-N-oxide water treatment method having a heat exchanger and re-circulation.

In embodiments as shown in FIG. 4, methylmorpholine-N-oxide water treatment method 5 includes heat exchanger 50, which adds heat to re-circulation 45. Without limitation, adding the heat may increase the reaction rate.

To further illustrate various illustrative embodiments of the present invention, the following examples are provided.

EXAMPLES

Example 1

A purpose of this Example was to determine the extent of the reaction of morpholine-N-oxide on a sulfur contaminant (i.e. $H_2S$) in water at varying mole ratios. The experiments were conducted at 40° C. and 60° C. At all mole ratios (morpholine-N-oxide:$H_2S$) down to and including 1.0:1.0, the destruction of $H_2S$ was complete at 60° C. after 24 hours. Elemental sulfur was a visible product. This sulfur was present as platelets ("flakes"). After 24 hours at 40° C., the reaction was complete only at a mole ratio of 3.0:1.0, although nearly complete reactions were recorded at ratios of 2.0:1.0 and 1.8:1.0. Reactions at lower mole ratios were variously incomplete and consistent with the lower loadings. After 48 hours at 40° C., the reaction was complete at all mole ratios except for the lowest loading (1.0:1.0). The product was variously present as a milky suspension and flaked solids.

For the experiment, a pint of archived sour water at pH-8.5 was used with an $H_2S$ content at 9,985 mg/liter (0.293 M/lit). The molecular weight of the solid methylmorpholine-N-oxide was 126.0. A methylmorpholine-N-oxide stock solution was prepared by dissolving 5.00 grams in 100.0 mLs distilled water (0.397 M/lit). To each of several screw-capped sample vials, 2.0 mLs of the sour water and a dash of powdered iron rust were added. The vials were then diluted with ~15 mLs of distilled water and the following volumes of methylmorpholine-N-oxide were added.

TABLE 1

Sample Makeup
[Methylmorpholine-N-oxide] = 0.397 M/lit
[$H_2S$] = 0.293 M/lit (@ pH ~8.5)
~0.5 gm $Fe_2O_3 \cdot xH_2O$

| Volume methylmorpholine-N-oxide stock | Mole ratio (Methylmorpholine-N-oxide:$H_2S$) |
|---|---|
| 1.477 mLs | 1.0:1 |
| 1.772 mLs | 1.2:1 |
| 2.067 mLs | 1.4:1 |
| 2.363 mLs | 1.6:1 |
| 2.658 mLs | 1.8:1 |
| 2.953 mLs | 2.0:1 |
| 4.430 mLs | 3.0:1 |

Three such series were prepared. Each series was treated as follows: series 1: heated at 40° C. for 24 hours (static), series 2: heated at 40° C. for 48 hours (static), series 3: heated at 60° C. for 24 hours (static). At termination of the reaction periods, the entire contents of each reaction vial were emptied into 20 mls of sulfide anti-oxidant buffer, and each was titrated with 0.100 M/lit $Pb^{++}$. The results are shown below.

TABLE 2

Reaction of Morpholine-N-oxide on $H_2S$ for 24 Hours @ 40° C.

| Sample | mls $Pb^{++}$ | Gms $H_2S$ Titrated | Gms $H_2S$ Added | % Reacted |
|---|---|---|---|---|
| 1.0:1 | 1.9 | 0.00019 | 0.000585 | 68% |
| 1.2:1 | 1.8 | 0.00018 | 0.000585 | 69% |
| 1.4:1 | 1.7 | 0.00017 | 0.000585 | 71% |
| 1.6:1 | 0.7 | 0.00007 | 0.000585 | 88% |
| 1.8:1 | 0.4 | 0.00004 | 0.000585 | 93% |
| 2.0:1 | 0.3 | 0.00003 | 0.000585 | 95% |
| 3.0:1 | 0.0 | 0.00000 | 0.000585 | 100% |

TABLE 3

Reaction of Morpholine-N-oxide on $H_2S$ for 48 Hours @ 40° C.

| Sample | mls $Pb^{++}$ | Gms $H_2S$ Titrated | Gms $H_2S$ Added | % Reacted |
|---|---|---|---|---|
| 1.0:1 | 0.4 | 0.00004 | 0.000585 | 93% |
| 1.2:1 | 0.0 | 0.00000 | 0.000585 | 100% |

TABLE 3-continued

Reaction of Morpholine-N-oxide on $H_2S$ for 48 Hours @ 40° C.

| Sample | mls $Pb^{++}$ | Gms $H_2S$ Titrated | Gms $H_2S$ Added | % Reacted |
|---|---|---|---|---|
| 1.4:1 | 0.0 | 0.00000 | 0.000585 | 100% |
| 1.6:1 | 0.0 | 0.00000 | 0.000585 | 100% |
| 1.8:1 | 0.0 | 0.00000 | 0.000585 | 100% |
| 2.0:1 | 0.0 | 0.00000 | 0.000585 | 100% |
| 3.0:1 | 0.0 | 0.00000 | 0.000585 | 100% |

Elemental sulfur, present as small platelets, had been precipitated during reaction.

TABLE 4

Reaction of Morpholine-N-oxide on $H_2S$ for 24 Hours @ 60° C.

| Sample | mls $Pb^{++}$ | Gms $H_2S$ Titrated | Gms $H_2S$ Added | % Reacted |
|---|---|---|---|---|
| 1.0:1 | 0.0 | 0.00000 | 0.000585 | 100% |
| 1.2:1 | 0.0 | 0.00000 | 0.000585 | 100% |
| 1.4:1 | 0.0 | 0.00000 | 0.000585 | 100% |
| 1.6:1 | 0.0 | 0.00000 | 0.000585 | 100% |
| 1.8:1 | 0.0 | 0.00000 | 0.000585 | 100% |
| 2.0:1 | 0.0 | 0.00000 | 0.000585 | 100% |
| 3.0:1 | 0.0 | 0.00000 | 0.000585 | 100% |

Elemental sulfur, present as small platelets, had been precipitated during reaction.

Example 2

A purpose of this example was to determine if a lower ratio than 1.0:1.0 of methylmorpholine-N-oxide:sulfide will completely remove sulfide from solution. The experiments were conducted at 40° C. and 60° C. At a mole ratio of 0.7:1.0 (methylmorpholine-N-oxide:$H_2S$), the oxidation and removal of sulfide appeared to be 98%-99% complete.

A pint of archived sour water at pH-8.5 was used that had an $H_2S$ content at 8,016 mg/liter (0.250 M/lit). A sample of solid 4-methylmorpholine-N-oxide was determined to have a molecular weight of 126.0. A 4-methylmorpholine-N-oxide stock solution was prepared by dissolving 5.00 grams in 100.0 mls distilled water (0.397 M/lit). To each of four screw-capped sample vials, 2.0 mls of the sour water and an amount of powdered iron rust were added. The vials were diluted to ~20 mls with distilled water after adding 0.822 mls of 4-methylmorpholine-N-oxide, which amounted to a reaction ratio of 0.7:1.0.

Two of the samples were placed in a 40° C. bath for a reaction time of 48 hours. The other two were placed in a 60° C. bath for 24 hours. At termination of the reaction periods, the entire contents of a reaction vial from each bath were emptied into 20 mls of sulfide anti-oxidant buffer, and each was titrated with 0.100 M/lit $Pb^{++}$. The sample reacted at 40° C. required 0.10 mls of the $Pb^{++}$ titrant, and the sample reacted at 60° C. required 0.05 mls. These analysis results calculated to 99% and 98% destruction of sulfide in the tests.

The second samples from these reactions were acidified with $H_2SO_4$. This was done in order to determine if there was any odor of residual $H_2S$. There was no odor of $H_2S$. Instead, there was the unmistakable odor of $SO_2$. A common reaction product of N-oxides with sulfur is thiosulfate. When thiosulfate is acidified, it disproportionates, forming $SO_2$. Elemental sulfur, present as small platelets, had been formed during both reactions.

Example 3

A sample from a large sour water tank was tested. Methylmorpholine-N-oxide with added temperature of 50° C. was found to reduce hydrogen sulfide to 0 ppm in 19 hours or less. During the course of the testing, discoveries were made about the catalytic effect of the voluminous corrosion solids in the tank. When such solids were present, methylmorpholine-N-oxide trials at ambient temperatures were found to be complete with hydrogen sulfide at 0 ppm after 24 hours treatment time. Other trials where the solids were removed prior to methylmorpholine-N-oxide treatment demonstrated that methylmorpholine-N-oxide reduced hydrogen sulfide to 0 ppm in six days at ambient conditions.

A sample of the tank was taken and found to be black from suspended corrosion solids ($Fe_2O_3$+FeS). Various analyses were conducted in order to determine $H_2S$ content so that a methylmorpholine-N-oxide dose could be calculated. Prior readings were 800-900 ppm $H_2S$. A test using a CHEMETS® sulfide colorimetric test kit estimated 400-500 ppm $H_2S$. Iodometric titration gave an $H_2S$ result of 600-700 ppm on the whole sample, and 400-500 ppm $H_2S$ on filtered sample.

The first demonstration was performed under standard conditions where treatments were assisted by heating at 50° C. Two different dosage levels were prepared using newly-made as well as eight month old formulation. One sample was run at ambient conditions. The test make-ups are below in Table 5.

TABLE 5

Reaction of Morpholine-N-oxide on $H_2S$ for 19 Hours @ Varying Temperatures

| First Tank Sample (mL) | methylmorpholine-N-oxide:$H_2S$ mole ratio | Temp (° C.) |
|---|---|---|
| 15 | 1.5:1 | 50 |
| 15 | 3:1 | 50 |
| 15 | 3:1 | 50 |
| 15 | 3:1 | Ambient |

After 19 hours under the test conditions described above, the heated samples were observed to be completely reacted ($H_2S$=0 ppm). Also, the ambient sample was mostly reacted as evidenced by a cloudy yellow solution, which is typical for that course of the reaction.

Verification of the completion of $H_2S$ oxidation was seen in the lead acetate test strips. A dark strip was untreated, the clear strip included the three heated samples with $H_2S$=0 ppm, and another strip was the ambient sample that was seen to be much lighter. A subsequent test with CHEMETS® colorimetric sulfide kit indicated the $H_2S$ levels in the ambient sample to be well below 100 ppm $H_2S$. These tests suggested that the presence of significant amounts of corrosion material were such a sufficient catalyst for timely methylmorpholine-N-oxide reactions that heat may not be a necessity in every application.

Lab trials were initiated to study the effectiveness of methylmorpholine-N-oxide at low dose rates and under ambient conditions. The sample array was intended to study the reaction rate of methylmorpholine-N-oxide with and without the iron oxide catalytic solids and also varying dose rates. One sample represented the most extreme test of methylmorpholine-N-oxide—ambient conditions with no iron oxide present and a methylmorpholine-N-oxide:$H_2S$ ratio of 1:1 (i.e., the lowest theoretical dose rate possible). Test parameters were summarized in Table 6.

TABLE 6

Reaction of Morpholine-N-oxide on H$_2$S for
24 Hours @ Ambient Temperatures

| Mole ratio methylmorpholine-N-oxide:H$_2$S | Solids Level | Temperature |
|---|---|---|
| 1:1 | Minimal | Ambient |
| 1.5:1 | Minimal | Ambient |
| 1.5:1 | Abundant - Sx Shaken | Ambient |

After 24 hours of exposure, methylmorpholine-N-oxide was found to produce complete eradication of H$_2$S in the sample with solids as evidenced. This was consistent with the ambient test with solids above. Also, the higher dose sample with no solids looked to be turning a darker shade of yellow, which indicated some initial progress in reaction.

Both of the samples with no solids present were also seen to progressively react with all the H$_2$S as well, at much longer reaction times. A summary of the results is included in Table 7.

TABLE 7

Summary of H$_2$S Treatment Results

| Solids Present | Mole Ratio | Time to H$_2$S = 0 ppm |
|---|---|---|
| Yes | 1.5:1 | 24 hours |
| No | 1.5:1 | 6 days |
| No | 1:1 (theoretical minimum) | 12 days |

Example 4

A sample was obtained comprising 9,066 ppm H$_2$S as measured using a CHEMETS® sulfide colorimetric test kit. Prior readings indicated the sample had a H$_2$S concentration greater than 12,000 ppm. A sample of solid 4-methylmorpholine-N-oxide was determined to have a molecular weight of 126.0. A 4-methylmorpholine-N-oxide stock solution was prepared by dissolving 5.00 grams in 100.0 mls distilled water (0.397 M/lit). The sample was distributed into three separate sample vials comprising 20 mL of the original sample. To each of the three sample vials an amount of powdered iron rust was added. Methylmorpholine-N-oxide was added to the three vials in an amount of 2, 2.5, and 3.8 mLs to provide a ratio of methylmorpholine-N-oxide:H$_2$S of 1.5:1, 2:1, and 3:1 respectively. The three samples were placed in a 50° C. bath for a reaction time of 24 hours. The results are shown in Table 8.

TABLE 8

Reaction of Morpholine-N-oxide on H$_2$S for 24 Hours

| methylmorpholine-N-oxide:H$_2$S mole ratio | Estimated Completed Reaction Time |
|---|---|
| 1.5:1 | >32 |
| 2:1 | 26 |
| 3:1 | <24 |

The 3:1 sample reached reaction completion at less than 24 hours. The 2:1 sample reached reaction completion at 26 hours. The 1.5:1 sample had not reached reaction completion by 32 hours when the experiment was stopped, however, the appearance of the vile indicated that some measure of the H$_2$S had been treated.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for removing hydrogen sulfide, comprising:
   (A) introducing a methylmorpholine-N-oxide solution to a vessel, wherein the vessel comprises a water layer and a gas layer, wherein the water layer and the gas layer comprise the hydrogen sulfide;
   (B) introducing methylmorpholine-N-oxide into the gas layer;

(C) introducing steam to the vessel, wherein steam removes at least a portion of the hydrogen sulfide from the water layer;
(D) allowing the steam comprising at least a portion of hydrogen sulfide from the water layer to evaporate into the gas layer;
(E) adjusting a hydrogen sulfide rate of evaporation by increasing the vessel temperature;
(F) treating the gas layer by allowing the methylmorpholine-N-oxide to react with the hydrogen sulfide; and
(G) treating the water layer by reducing a temperature of the gas layer to a temperature below the boiling point of methylmorpholine-N-oxide thereby allowing the methylemorpholine-N-oxide to condense into the water layer.

2. The method of claim 1, further comprising allowing the hydrogen sulfide in the water layer to react with the methylmorpholine-N-oxide.

3. The method of claim 1, wherein the treating the water layer comprises converting the hydrogen sulfide to elemental sulfur.

4. The method of claim 3, wherein the elemental sulfur is removed from the vessel.

* * * * *